United States Patent

[11] 3,577,806

[72] Inventor Robert H. Schaefer
 Westfield, Ind.
[21] Appl. No. 852,709
[22] Filed Aug. 25, 1969
[45] Patented May 4, 1971
[73] Assignee General Motors Corporation
 Detroit, Mich.

[54] HYDRAULIC MODULATOR VALVE CONTROL
 11 Claims, 4 Drawing Figs.
[52] U.S. Cl. .................................................. 74/868
[51] Int. Cl. ...................................... B60k 21/00,
 B60k 19/00
[50] Field of Search .......................................... 74/868,
 865, 867, 869

[56] References Cited
 UNITED STATES PATENTS
2,982,147 5/1961 Panhard ...................... 74/865
3,004,447 10/1961 Sand ............................ 74/868
3,142,999 8/1964 Searles et al. ................. 74/868

Primary Examiner—Leonard H. Gerin
Attorneys—W. E. Finken and A. M. Heiter

ABSTRACT: A transmission for an engine having a fuel feed control member movable from zero to full throttle position and an automatic shift control system operative in response to an output governor pressure signal and a torque demand pressure signal for shifting the transmission between low and high speed drives. A force transmitting system for transmitting a force proportional to torque demand position having a pair of expansible chambers interconnected by a fluid passage filled with fluid and each chamber having a movable wall. A spring positioned between said movable torque demand member and one movable wall generates a force proportional to torque demand position on the one movable wall so the system pressure is proportional to torque demand and the system transmits to the other movable wall a force proportional to the position of the torque demand member without significant fluid movement in the system. The other movable wall actuates a regulator valve to provide a torque demand pressure proportional to the position of said torque demand member which functions with a governor pressure to control the automatic shift valves.

Patented May 4, 1971

INVENTOR.
Robert H. Schaefer
BY
a. M. Heiter
ATTORNEY

INVENTOR.
Robert H. Schaefer
BY
a. M. Heiter
ATTORNEY

HYDRAULIC MODULATOR VALVE CONTROL

This invention relates to transmissions and particularly to transmission control systems employing a torque demand signal pressure.

In automatic transmission control systems, it is important that the transmission operating signals such as the torque demand signal which originates in the engine fuel feed control system be accurately transmitted to the transmission and the controls therein, notwithstanding movement of the vehicle, relative movement of the engine and transmission components, wear and abuse of the engine fuel feed and the transmission torque demand control components, and extreme temperature variations causing marked difference in the viscosity of the control fluid. Thus, in accordance with this invention, the applicant has provided a transmission having an automatic shift control system controlled by output governor signal pressure and a torque demand signal pressure which more accurately reproduces the torque demand signal at the transmission controls. The signal repeating mechanism consists of a sending unit located on the engine which is connected by a passage to a receiving unit at the transmission controls. The sending and receiving units have a low friction roll type diaphragm located in a housing to provide an expansible chamber between the diaphragm and an adjacent fixed wall of the housing. These expansible chambers are connected by a constant volume passage or pipe which may be flexible. The torque demand signal is derived from a lever in the engine fuel feed system which moves in proportion to torque demand from a zero torque demand or throttle position to a full torque demand or throttle position and compresses a spring located between this lever and the diaphragm of the sending unit mounted on the engine. Thus this member, on movement with torque demand, exerts a force and generates a pressure in the fluid in the system proportional to torque demand. This pressure in the chamber of the receiving unit generates a force which is connected by a strut to act on a pressure regulating valve to overcontrol the regulator valve which is acted on by the regulator valve forces, a biasing spring and the regulated fluid pressure force, in order to provide a regulated fluid pressure proportional to torque demand. This signal transmitting system functions without significant movement of fluid in the transmitting system because the regulating valve is designed for regulating without significant movement and dwells at its regulating position.

An object of the invention is to provide in a transmission having a control system, a control signal transmitting system for converting a signal proportional to the position of a member into a pressure signal proportional to the position of the member in the transmitting system which controls a dwell regulator valve to provide a pressure proportional to the position of the member without significant fluid movement in the transmitting system.

Another object of the invention is to provide in a transmission having a control system, a control signal transmitting system for converting a signal proportional to the position of a member into a pressure signal proportional to the position of the member in a transmitting system and to insure that the transmitting system is completely filled with fluid each time the pressure in the transmitting system is zero to control a dwell regulator valve to provide a pressure proportional to the position of the member without significant fluid movement in the transmitting system.

Another object of the invention is to provide in a transmission having a control system responsive to an engine torque demand signal derived from a member on the engine movable in proportion to torque demand and operating through a spring to apply a force proportional to its position to a movable wall of a sending unit to generate a pressure proportional to the position of the movable member in the transmitting system which has the sending unit, a transmitting portion and a receiving unit which has a movable wall to convert the fluid pressure into a force proportional to the position of the member which acts on a variable pressure regulating valve which, functioning in the dwell position, regulates a fluid pressure proportional to the position of the member whereby the system transmits a force proportional to the position of the member without significant movement.

Another object of the invention is to provide in a transmission having an automatic shift control system responsive to a governor signal and an engine torque demand signal derived from a member on the engine movable in proportion to torque demand from zero to full torque demand and operating through a spring to apply a force proportional to its position to a movable wall of a sending unit to generate a pressure proportional to the position of the movable member in the transmitting system which has the sending unit, a transmitting portion and a receiving unit, of constant volume fluid capacity which is filled if needed each time the sending unit is in zero torque demand position and the system pressure is zero and the receiving unit having a movable wall to convert the fluid pressure into a force proportional to the position of the member which acts on a variable pressure regulating valve which, functioning in the dwell position, regulates a fluid pressure proportional to the position of the member whereby the system transmits a force proportional to the position of the member without significant movement.

Another object of the invention is to provide in a transmission control system an improved control system for transmitting a force proportional to the position of a member movable from a zero to a maximum position having a fluid pressure chamber with a rolling diaphragm, a movable valve member connected by a lost motion connection to the diaphragm, a spring connected between the member and the valve element operative in the zero position of the member and in a range of lost motion movement to open a valve connecting a reservoir to said pressure chamber to insure that it and a transmitting system connected thereto are completely filled and thence on further movement of the member to close the valve and trap fluid in the pressure chamber and transmitting system and apply a force to said diaphragm and thus generate a pressure in said transmitting system proportional to member position.

These and other objects of the invention will be more apparent from the following description and drawing of the preferred embodiment of the invention.

FIG. 1 schematically shows an engine and a transmission and a control system therefor including a fuel feed control for the engine and a torque demand control for the transmission.

Figure 4:
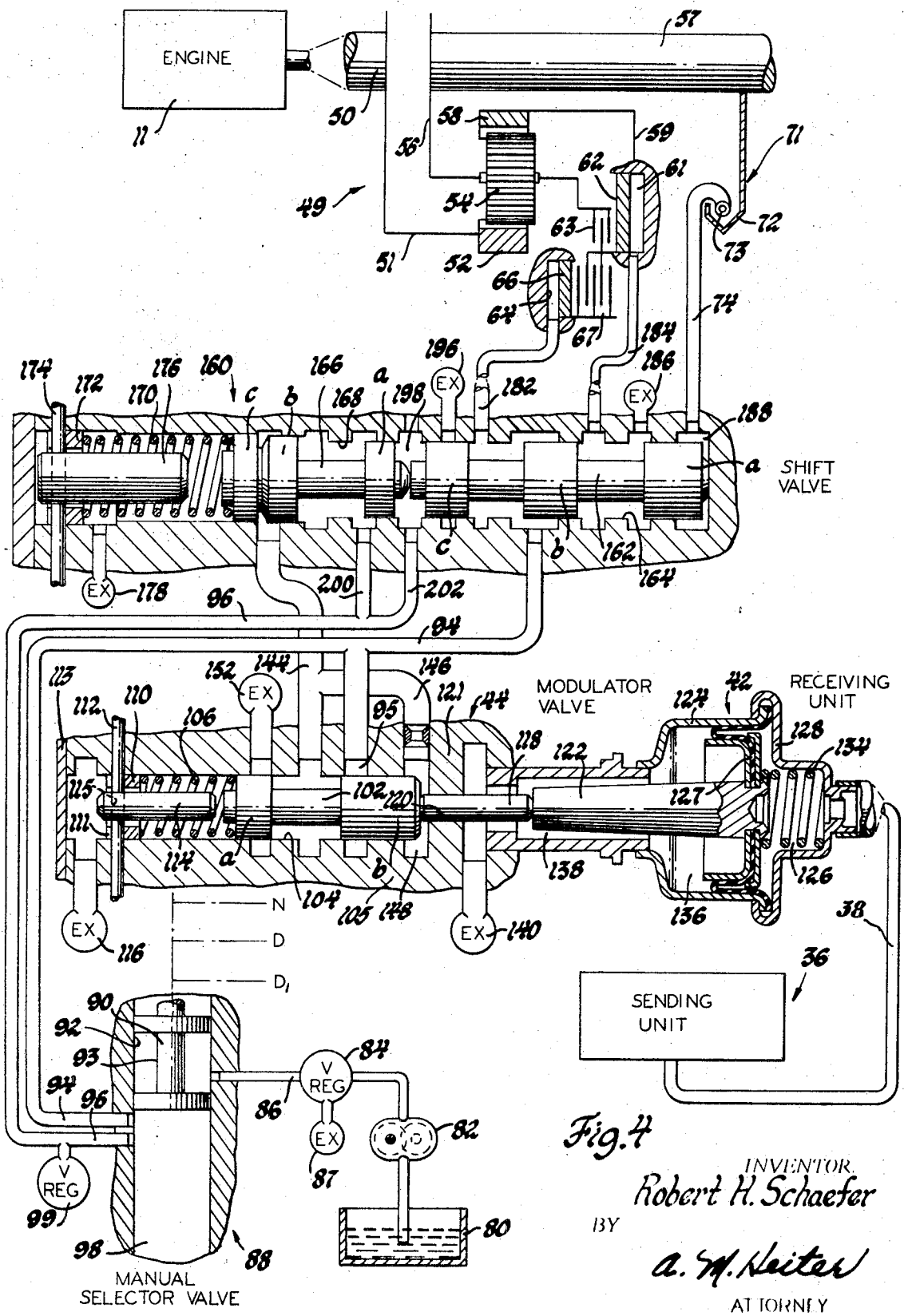

FIG. 4 schematically shows a transmission and automatic shifting controls with a single torque demand pressure.

The transmission 10 is driven by an engine 11 having a throttle controlled carburetor 12 or other fuel feed mechanism such as a speed control of a governor controlling fuel feed, controlled by an accelerator pedal 14 connected by a link 16 and the bellcrank transfer levers 18 to a rod 22 which rotates a lever 24 pivotally mounted on the carburetor. The lever 24 is connected by a link 26 to rotate the throttle control lever 28 to thereby control the throttle valve. The lever 24 is also connected by a rod 32 which is pivotally connected to the torque demand lever or member 34 which moves between zero and full throttle positions in accordance with movement of the throttle and throttle pedal 14 and actuates a proportional force sending unit 36 which provides in the interconnecting fluid passage 38 a fluid under pressure to actuate a receiving unit 42 located in the transmission which duplicate the force proportional to position of the torque demand member 34 and controls a torque demand regulator valve 44 to provide a pressure proportional to the position of the torque demand member.

The multispeed transmission drive 10 providing two or more speeds, illustrated by the simple two speed gear unit 49 driven by an engine 11 which, having a throttle pedal 14 for manual control of fuel feed or a speed governor controlling fuel feed for constant output speed, may be varied by a speed control pedal similar to the throttle pedal. The input shaft 50 driven by the engine drives the input drum 51 and ring gear 52 which meshes with the planetary pinions 54 rotatably mounted on the carrier 56 which drives the output shaft 57. The pinions 54 mesh with the control sun gear 58 which is drive connected to sleeve shaft and drum 59 which has a rotating cylinder 61. When fluid pressure is supplied to the cylinder 61, the piston 62 therein moves to engage the clutch 63 to connect the carrier 56 and sun gear 58 to lock up the gear set for a 1:1 drive.

The sun gear 58 is also connected by the shaft and drum 59 to the rotary plates of the brake 67. When fluid is supplied to the fixed cylinder 64 to move the piston 66 to engage the fixed and rotary plates of brake 67, the sun gear 58 is held to provide a reduction or low speed drive.

A suitable governor, such as pitot governor 71 or a stepped governor, provides a governor signal pressure proportional to output shaft speed in the governor signal line 74. The governor 71 is illustrated as a pitot tube governor having an annular can 72 mounted for rotation with the output shaft 57 and filled with fluid which impinges on the open end of pitot tube 73 to provide governor pressure proportional to speed in governor line 74. Exhaust fluid from the control and lubrication system returns to the sump 80 and is delivered by the input driven pump 82 at a pressure regulated by the regulator valve 84 to the main line 86 with the excess fluid exhausted by exhaust 87. A manual selector valve 88 has a valve element 90 slidable in bore 92 and having a recess 93 which, in the neutral position shown, blocks passage from the main line 86 and connects the drive line 94 and the drive 1 line 96 to exhaust 98. When the valve is moved to the drive position, the main line is connected to the drive feed line 94 and when moved to the drive 1 position, is connected to both the drive feed line 94 and the drive 1 feed line 96. Regulator valve 99 regulates drive 1 pressure at a lower value, i.e. 30 p.s.i. than main line regulator valve i.e. 100 to 150 p.s.i.

The inverted modulator valve 44 provides a pressure inversely proportional to torque demand. Modulator valve 44 has a valve element 102 having equal diameter lands a and b located in a bore 104 in body 105. The valve element is biased in a pressure increasing direction by a biasing spring 106 which seats against an adjustable spring seat ring 110 which is held in any one of several adjusted positions by the fastener pin 112. Fastener pin 112 also supports a stop pin 114 which prevents excessive movement of the valve, excessive compression of the spring and guides the spring coils to keep them aligned.

The spring seat ring 110 shown in the applicant's copending application Ser. No. 852,774, filed Aug. 25, 1969, has a series of recesses 111 of gradually differing depth on opposite sides of the ring with pairs of recesses of the same depth being diametrically opposite to each other. Before the valve cover 113 is placed over the end of the bore, the valve element, spring seat washer, spring seat ring and stop pin are assembled in the bore and the fastener pin is inserted through a pair of diametrically opposite recesses in the spring seat ring and an aperture 115 in pin 114 to locate the spring seat and stop pin. With this construction, the compression of spring 106 may be adjusted by removing the cover 113 and pushing the seat ring 110 into the bore against the spring until the recesses 111 clear the pin 112 and then rotating the seat ring so the pair of recesses with the desired depth seat on fastener pin 112. The spring chamber is vented by exhaust 116. Land b at the other end of the valve engages a force transmitting strut or pin 118 which is reciprocally mounted in a bore 120 in the end wall 121 of the bore 104.

The fluid operated force transmitting actuator 42 or receiving unit provides a force transmitted by strut 122 proportional to the position of lever 34 as it is moved from zero to full torque demand positions by a throttle pedal, a diesel fuel feed rack, a fuel feed control actuated by an engine speed governor, a speed control of a fuel feed governor or other torque demand control devices. The strut 122 is secured to a rolling diaphragm 127 secured and sealed in a housing 124 to form an expansible pressure chamber 126 between the diaphragm 127 and wall portion 128 of the housing. The chamber 126 is connected by passage 38 to port 132 of sending unit 36. A spring 134 is located between wall 128 and diaphragm to provide a minimum residual actuator force just sufficient to hold the strut 122 in contact with pin 118 and it in contact with valve element 102. The unpressurized chamber 136 opposite pressure chamber 126 and space 138 are vented to exhaust 140. This actuator force, curve 142, described below, is transmitted by strut 122 and pin 118 to the valve element 102. In a short range of closed and part throttle positions when there is no actuator force due to throttle position and only the minimal force of spring 134 supplied to pin 118, the valve element 102 is in the position connecting drive line 94 between the lands a and b to the inverted modulator pressure line 144 and via the restricted branch 146 to the closed chamber 148 to act on the end land b to provide a pressure regulated at the value of spring 106 and slightly diminished by spring 134 as shown by the initial constant pressure portion of the inverted modulator pressure curve 150. The flat portion of this curve extends beyond the initial increase in actuator force as by the distance, small pin effect, because the inverted modulator pressure in chamber 148 opposes the force transmitted from the actuator 42 by pin 118. Thus an initial flat or constant pressure portion of the inverted modulator pressure curve 150 is accurately determined by the force of springs 106 and 134 and valve land area and may be made longer by increasing the size of the cross section area of pin 118 to delay the decrease of inverted modulator pressure. As the actuator force increases, inverted modulator pressure decreases as indicated by curve 150. The inverted modulator pressure is reduced to zero at a high throttle or torque demand value slightly lower than the torque demand value at which the actuator output force exceeds the force of spring 106 to hold the regulating valve element 102 to the left to first block the port of line 94 and then vent fluid from inverted modulator line 144 to exhaust 152. The space between lands a and b is only slightly less a few thousandths of an inch or equal to the distance between exhaust port 152 and port 95 for supply from drive line 94 so that during regulation the valve element 102 dwells or has substantially no movement, the movement being only a few thousandths of an inch. Thus during regulation, there is substantially no movement of diaphragm 127 and the fluid in the system as explained below. Also, the valve element movement on shutdown is about half or less than half the width of a port so the total valve movement, even when the system is shut down or started up, is very small and thus there is very little movement of diaphragm 127 at this time.

Shift valve 160 has a shift valve element 162 having lands a, b and c located in a bore 164. The valve land a is slightly smaller than the valve land b so that on an upshift the fluid pressure supplied to engage a drive flowing between these lands acts on the larger area of land b to provide a primary hysteresis force acting in the upshift direction. The land c is the same size as land b. The control valve 166 has lands a, b and c of increasing diameter located in a three stepped bore 168. A spring 170 engages the end of control valve 166 and seats on an adjustable seat 172, like the above described seat 110, and is similarly secured to the valve body by a similar pin 174. A stop pin 176 suitably mounted on the pin 174 limits compression of the spring 170 and fits within the spring which fits in the bore to locate and guide the spring. The exhaust 178 vents the spring chamber.

Figure 3:
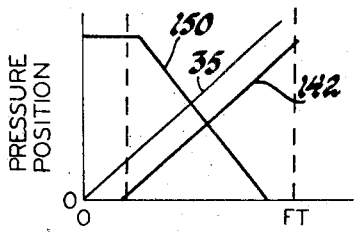
FIG. 3 shows torque demand position and pressure curves.

With the valve in the downshift position shown, drive pressure line 94 is connected between the lands b and c to the low speed drive apply line 182 to place the transmission in the low speed drive. The high speed drive apply line 184 is connected to exhaust 186. The governor pressure in line 74 is connected to the closed chamber 188 at the end of the bore 164 and acts on the land a in an upshift direction. The inverted modulator pressure, as illustrated by curve 150, FIG. 3, is supplied by line 144 to the space between lands b and c of control valve 166 and acts on the unbalanced area of land c to provide a bias force on the control valve in an upshift direction against the force provided by spring 170.

The inverted modulator force varies like the inverted modulator pressure with increasing throttle or torque demand. The constant spring force is opposed by the inverted modulator force which therefore has a negative value and is subtracted from the spring force to determine the net summation force opposing an upshift when the shift valve is in a downshift position. At any torque demand value when the speed of the output shaft has a value providing a governor pressure force greater than the net summation downshift force, the control valve and the shift valve will upshift together. In the upshift position, the drive line 94 is connected between lands a and b to high speed apply line 184 to engage high ratio. The low speed ratio is disengaged by the connection of low speed apply line 182 between lands b and c to exhaust 196.

During the normal automatic shifting operation the downshift chamber 198 between the control valve element 166 and the shift valve element 162 is exhausted by branches 200 and 202 of drive one line 96. When the upshift is completed, the land a of control valve 166 closes branch 200 and the land b uncovers the port of inverted modulator line 144 so that the inverted modulator pressure in addition to acting on the unbalanced area of land c, now also fills the space between lands a and b and additionally acts on the unbalanced area of land b to provide an increased torque demand force acting on the valve in opposition to the spring 170. Also on an upshift, valve 162 has moved to the left, and since land a is smaller than land b, the fluid at main line pressure connected to the high speed apply line 184 provides a primary hysteresis force in an upshift direction. The spring force and the inverted modulator pressure acting on land c are the same as during upshift operation. The added primary hysteresis force adds a constant value to inverted modulator force. The inverted modulator pressure is now acting on an additional area, land b and provides an added inverted modulator hysteresis force. Thus, the total bias force opposing the spring force, including the sum of the torque demand forces, the normal inverted modulator bias and the inverted modulator hysteresis, and the constant primary hysteresis vary like these forces during upshift but have a larger value.

The net downshift bias force the spring force, shown less the opposing total bias force varies from zero to full throttle like the upshift forces but has a lower value. When the governor pressure force is less than this net downshift force at any throttle position, the net downshift force overcomes governor force and a downshift will occur.

When the governor force exceeds the summation force opposing an upshift which increases at a low rate with increasing torque demand, the shift valve upshifts. The net downshift bias force and net upshift bias force increase respectively at a high and a low rate with torque demand so the downshift speed and upshift speed similarly increase with torque demand.

Reference is made to the applicant's copending application Ser. No. 852,774, filed Aug. 25, 1969 for a more detailed description of the operation of this shift valve.

The sending unit 36 has a housing 203 having a cylindrical chamber portion 204 located below a reservoir portion 206. The fluid passage 48 is connected at the port 132 of chamber portion 204 of the housing to the expansible chamber 208 which has a movable wall formed by the rolling diaphragm 210 which is bonded or adhesively secured at its outer perimeter to the rounded roll lip 212 of the diaphragm guide cylinder 214 formed as an inner surface of the partition member 216. The partition member on its outer round surface and the housing on the adjacent inner round surface has stepped locating surfaces 218 to radially and axially locate the partition member in the housing. Adjacent the roll lip 212 there is an annular seal space 215. The outer perimeter of the diaphragm has a rolled portion forming an O-ring like seal 217 integral with the diaphragm which fits in the seal space 215, to fluid seal the diaphragm to the housing. The securing clamp ring 222 bears on a shoulder 223 on partition member 216 and has a plurality of ears 224 and screws 226 threaded into the housing to clamp the partition member to the locating surfaces 218. In this clamped position, the partition member clamps O-ring like seal 217 in space 215 to seal the diaphragm to the housing but roll lip 212 does not exert a high pressure on the diaphragm between it and the housing which might cut the diaphragm. The valve stem 228 has a cylindrical locating surface 230 and a stop shoulder 232 to receive and locate a spring seat member 234 on the valve stem 228. The spring seat member has a bore 233 fitting surface 230, an end portion 235 engaging shoulder 232 and a spring seat recess 236 in which spring 238 seats to transmit a force to the spring seat member and then the valve stem. A movable valve member 242 has an outer cylindrical guide surface 244 to guide the inner fold of the roll diaphragm and an inner cylindrical bore 246 slidably mounted on the valve stem. Snap ring 248 fitting in a groove at the lower end of valve stem provides a stop engaging the lower edge of the movable valve member 242 so the valve member may move a short distance upwardly relative to the stem and downward movement is limited by stop snap ring 248. The movable valve member has adjacent its outer surface an upper surface 252 for engagement with a shoulder 254 on the partition member 216 to limit upward movement of the movable valve member 242 and through snap ring 248 limiting upward movement of the valve stem 228 and spring seat member 234. The movable valve member 242 has within or at the inner portion of surface 252 a seal 256 positioned for sealing engagement with surface 235 on the spring seat member 234. The inner perimeter of annular diaphragm 210 is adhered or bonded to the lower surface of movable valve member 242 and thus the diaphragm has a central opening 254 providing fluid access to passage 255 extending through the valve stem from the lower end thereof and extending axially and laterally to the space 258 between the movable valve member 242 and diaphragm at the lower side and the partition 216 and spring seat member 234 at the upper side. The fill passage 257 connects the reservoir to space 258 and the space directly above the diaphragm. Note passage 257 is recessed in stop surface 254 so it and stop surface 252 cannot block this passage. The lever 34 moved with torque demand is fixed to a shaft 262 rotatably mounted in the housing and rotatably fixed to lever 264 which has at the other end an apertured spring seat 266 fitting over the valve stem 228 and engaging the top of spring 238. A stop nut and locknut 268 threaded on the upper end of valve stem 228, which has a screw slot to facilitate tightening and adjusting the nuts, limits upward movement of lever 264 relative to valve stem 228. A coil spring 272 biases the spring seat 266 end of lever 264 upwardly to the zero throttle position. The reservoir has a cover 274 held in place by a rotary snap bail 276 pivoted to opposite ends of the housing.

OPERATION

Figure 2:
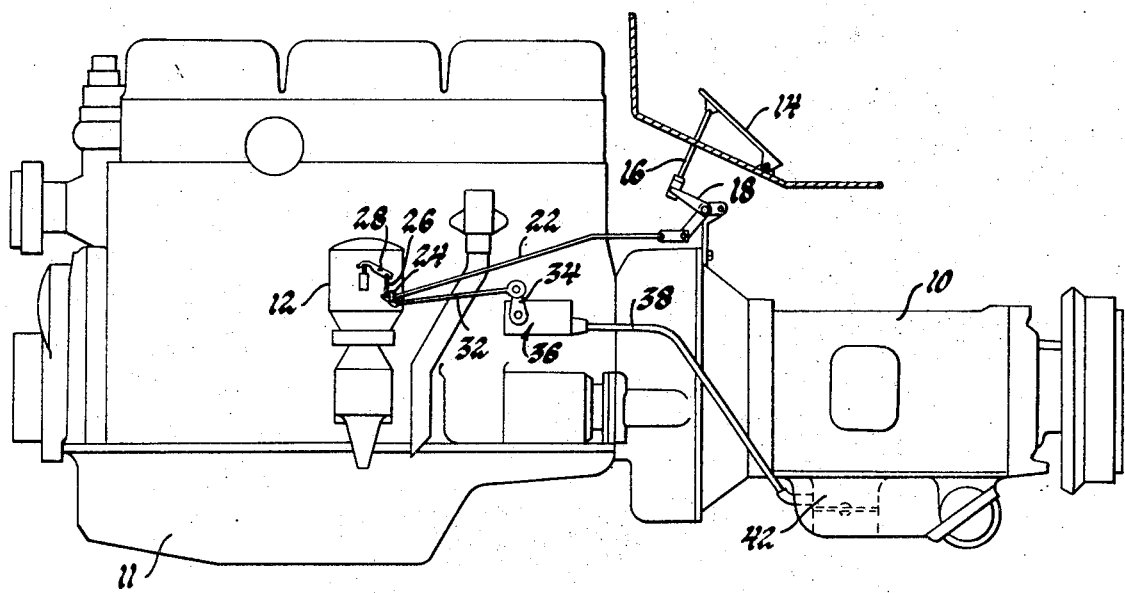
FIG. 2 is a detail of a sending unit providing a force proportional to the position of a fuel feed member.
Figure 2:
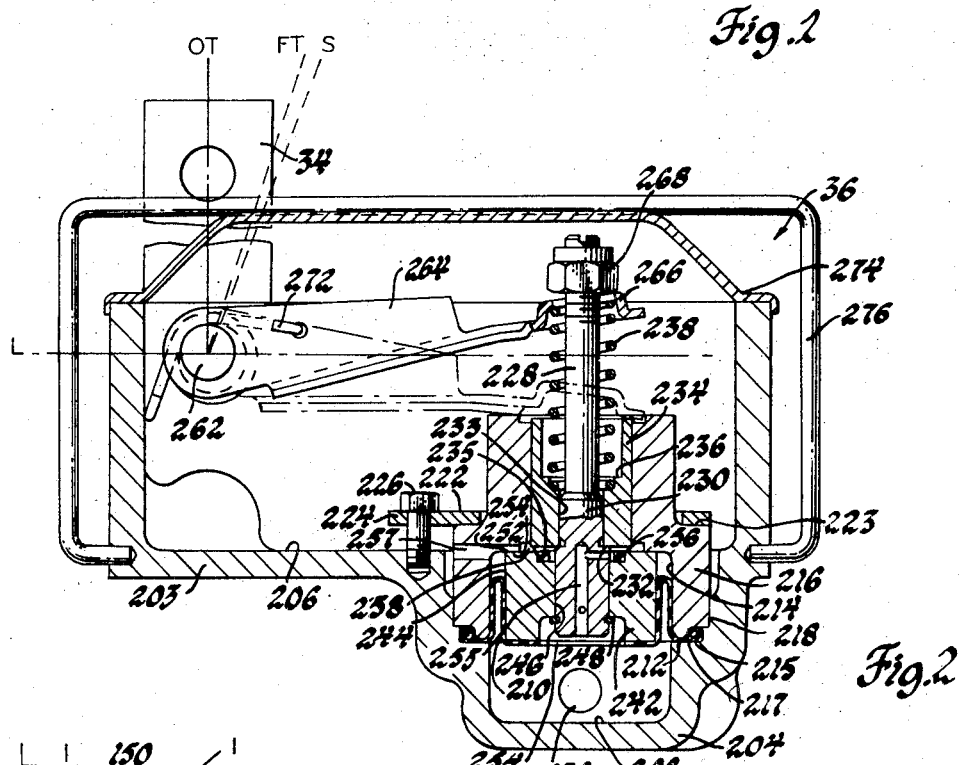

When throttle pedal 14 is moved from the zero throttle position to the full throttle position, lever 34 is similarly moved from the zero throttle position OT to the full throttle position FT. In the zero throttle position as shown in full lines in FIG. 2, the retraction spring 272 insures that seat portion 266 of lever 264 is biased counterclockwise and engages the lower side of stop nut 268 lifting valve stem 228 which, through snap ring 248, lifts the movable valve member 242 so the surface 252 thereof engages the shoulder 254 to position the movable valve member and diaphragm 210 in the zero throttle position. The spring 238, which has no bias or a small preload, biases spring seat 234 against shoulder 235 but does not move the valve stem downwardly because it is held by the stop nut 268. Alternatively, spring seat member 234 may be pressed on the valve stem so they move together. The fluid in the reservoir, which is filled to the level L flows through the feed passage 257 to fill the space within and between partition member 216 and diaphragm 210 and flows to space 258 and thence through passage 256 and opening 254 in the diaphragm to completely fill chamber 208, the port 132 and passage 38 and the chamber 126 of the receiving unit 42.

As the throttle controlled lever 34 moves from the zero throttle position during a first small range of movement, lever 264 slightly compresses spring 238 and moves the spring seat member 234 and valve stem 228 together. While the above fill or feed passage from reservoir 206 to chamber 208 remains open to insure that the transmitting system is completely filled, no pressure is generated in chamber 208. When the lost motion between the movable valve member 242 and the valve stem 228 is taken up, the seal 256 engages surface 235 to block the fill passage and seal the filled fluid transmitting system consisting of chamber 206, connecting passage 38 and chamber 126 in the filled condition. Then further movement of lever 264 toward the full throttle position further compresses the spring 238 proportionately increasing the force on the diaphragm and thus proportionally increasing the pressure in the fluid system. At the full throttle position FT the maximum system pressure is provided and a few degrees beyond at a stop position S the lever 264 engages the top of partition member 216 and positively limits further movement. Thus system pressure at zero throttle and a small range of low throttle positions is zero and then increases proportionally with increasing throttle positions. When the spring 238 is not preloaded, the pressure rise, curve 142, is constantly in proportion to the position of lever 34, indicated by curve 35. In some engines, a small throttle advance provides a proportionally large increase in torque. Then it is desirable to make the lost motion small and preload spring 238 so that there is a rapid increase in transmitting pressure in this low throttle range and then a proportional increase as in curve 142.

The inverted modulator pressure regulator valve 44 has a spacing between lands a and b of valve element 102 only slightly less or substantially equal to the spacing between exhaust port 152 and supply port 95 of drive line 95 so the valve regulates by dwelling at the regulating point. The dwelling movement at the regulating point is only a few thousandths of an inch so there is no significant movement of the diaphragm or the fluid in the connecting passage 132 during the normal regulating operation. Thus the system transmits a force proportional to the throttle or torque demand position of a member by a closed fluid pressure system without any significant fluid flow or movement as occurs in position repeating systems and controls a dwelling regulator valve to provide a regulated pressure inversely proportional to torque demand. Opening the fill passage also establishes zero pressure each time lever 34 is set to the zero throttle position.

This inverted modulator pressure and governor pressure control the shift valve 160 as explained above.

When the selector valve 88 is moved to the drive one position, the main line 86 in addition to supplying drive line 94, also supplies drive one line 96 which is regulated by low pressure regulator valve 99 and connected by either branch 200 or 202 to the space 198 between shift valve 162 and control valve 166. When the valves are in the downshift position shown, the connection is made by branch 202 when the valves are in the upshift position by branch 200.

The drive one pressure has a pressure value regulated by regulator valve 99, such that the shift valve will remain downshifted at all speeds attainable in low speed drive with the engine driving as explained in detail in the applicant's above copending application. When a manual downshift is made at this highest speed during overrun, the engine will be motored at a speed greater than governed or rated speed. The hold pressure in drive one line is regulated so governor pressure and primary hysteresis pressure will hold the shift valve upshifted until the output speed reduces to a value so that after a downshift, the input or engine speed, provides good engine braking without excessive abuse of the engine. At a higher output speed, determined in relation to the above downshift speed by the fixed primary hysteresis force, governor pressure, acting alone with the shift valve downshifted, will overcome hold pressure to upshift the shift valve to prevent excessive engine speed.

While in the above description reference to upper and lower provides an improved construction for gravity feed, it will be appreciated that these references are not necessary to all the modifications that may be made of the above described preferred embodiment of this invention.

I claim:

1. In a transmission; input means; output means; multispeed drive means connecting said input means and output means having means to establish a low speed drive and a high speed drive to said output means; signal means including a member movable in proportion to a control function; position responsive pressure signal means including a pair of spaced fluid chambers, a passage interconnecting said chambers, a movable wall sealing each fluid chamber, fluid filling said fluid chambers and passage; spring means operatively connecting said member to one of said movable walls to provide a force on said one movable wall and a pressure on said fluid in said chambers and passage and a force on said other movable wall proportional to the position of said member and shift control means operatively connected to said other movable wall for control of said shift control means and said shift control means connected to said drive means to selectively establish said low and high speed drives.

2. The invention defined in claim 1 and said shift control means including regulator valve means having a regulating dwell point at which it regulates without significant movement and said other movable wall applying a force to said regulating valve means to control the regulated pressure proportionally to said force without significant movement of said other movable wall and the fluid in said chambers and interconnecting passage.

3. The invention defined in claim 2 and said chambers and interconnecting passage being a fluid pressure transfer system having a constant volume and fill means including a fill passage, valve means controlling said fill passage from a fluid source to said fluid pressure transfer system operative when the member is in a minimum position and the fluid pressure in said system is at a minimum value to fill the system, if needed, and operative on movement of said member from said minimum position to close said valve means to seal said filled fluid pressure transfer system for pressure transfer without fluid movement.

4. The invention defined in claim 1 and a housing having a reservoir and said one chamber in a portion of said housing below said reservoir with said movable wall located between said chamber and reservoir and having a central opening therein; a valve stem reciprocally mounted in said housing and having one end portion extending through said opening in said movable wall and having a fill passage in communication with said chamber extending axially through said valve stem to the other side of said movable wall; lost motion and valve means between said valve stem and movable wall limiting upward movement of said valve stem relative to said movable wall and opening said fill passage to said reservoir and on downward movement of said valve stem relative to said movable wall closing said fill passage and limiting relative movement; the other end of said valve stem having a stop and a spring seat between said stop and movable wall; stop means between said movable wall and said housing limiting upward movement of said movable wall; said movable member in said minimum position engaging said stop on said valve stem lifting said valve stem to position said movable wall against said stop means and actuate said lost motion and valve means to open said valve means for communication from said reservoir through said fill passage to said one chamber; said spring being between said member and spring seat and operative on movement of said member from said minimum position to close said valve means and generate a fluid pressure in said one chamber proportional to movement of said member.

5. In a transmission; input means; output means; multispeed drive means connecting said input means and output means having means to establish a low speed drive and a high speed drive to said output means; torque demand means including a member movable in proportion to torque demand from zero to full torque demand; position responsive pressure signal means including a pair of spaced fluid chambers, a passage interconnecting said chambers, a movable wall sealing each fluid chamber, fluid filling said fluid chambers and passage; spring means operatively connecting said member to one of said movable walls to provide a force on said one movable wall and a pressure on said fluid in said chambers and passage and a force on said other movable wall proportional to the position of said member between said zero and full torque demand positions and shift control means operatively connected to said other movable wall for control of said shift control means and said shift control means connected to said drive means to selectively establish said low and high speed drives.

6. The invention defined in claim 5 and fill means having a fill passage and operative to fill, if needed, through the fill passage the fluid chambers and interconnecting passage when the pressure therein is zero.

7. The invention defined in claim 6 and said fill means having means operative in response to movement of said member from said zero torque demand position and pressure in said one chamber to close said fill passage so said chambers and interconnecting passage constitute a constant volume space.

8. The invention defined in claim 7 and the total volume of said chambers and interconnecting passage to the valve in said fill passage having a constant volume in all operative positions.

9. The invention defined in claim 8 and said shift control means including a regulator valve means having a regulating position at which it regulates without significant movement and receiving said force from said other diaphragm so there is no significant movement of the fluid in the chambers and interconnecting passage.

10. The invention defined in claim 5 and a housing having a reservoir and said one chamber in a portion of said housing below said reservoir with said movable wall located between said chamber and reservoir and having a central opening therein; a valve stem reciprocally mounted in said housing and having one end portion extending through said opening in said movable wall and having a fill passage in communication with said chamber extending axially through said valve stem to the other side of said movable wall; lost motion and valve means between said valve stem and movable wall limiting upward movement of said valve stem relative to said movable wall and opening said fill passage to said reservoir and on downward movement of said valve stem relative to said movable wall closing said fill passage and limiting relative movement; the other end of said valve stem having a stop and a spring seat between said stop and movable wall; stop means between said movable wall and said housing limiting upward movement of said movable wall; said movable member in said minimum position engaging said stop on said valve stem lifting said valve stem to position said movable wall against said stop means and actuate said lost motion and valve means to open said valve means for communication from said reservoir through said fill passage to said one chamber; said spring being between said member and spring seat and operative on movement of said member from said minimum position to close said valve means and generate a fluid pressure in said one chamber proportional to movement of said member.

11. In a transmission; input means; output means; multispeed drive means connecting said input means and output means having means to establish a low speed drive and a high speed drive to said output means; torque demand means including a member movable in proportion to torque demand from zero to full torque demand; position responsive pressure signal means including a pair of spaced fluid chambers, a passage interconnecting said chambers, a movable wall sealing each fluid chamber, fluid filling means for filling said fluid chambers and passage when said member is in said zero position and for establishing zero pressure in said chambers and passage and spring means operatively connecting said member to one of said movable walls to provide a force on said one movable wall first closing said fluid filling means and then establishing a pressure on said fluid in said chambers and passages and a force on said other movable wall proportional to the position of said member between said zero and full torque demand positions; a source of fluid under pressure; regulator valve means having a valve element and biasing means connected to said other movable wall including the force provided by said other movable wall acting on said valve element and an unbalanced area on said valve element acted on by the regulated pressure and having a supply port connected to said source, an exhaust port and a regulated pressure port between said supply and exhaust ports and a valve element having lands spaced substantially the same as the inner distance between said ports for dwell regulation without substantial valve movement so there is substantially no fluid flow in said interconnecting passage.

UNITED STATES PATENT OFFICE
CERTIFICATE OF CORRECTION

Patent No. 3,577,806　　　　　　　　　Dated　May 4, 1971

Inventor(s)　Robert H. Schaefer

It is certified that error appears in the above-identified patent and that said Letters Patent are hereby corrected as shown below:

In the specification, column 5, line 44, -- , (comma) -- should be inserted after the word "force" first occurrence and ", (comma) shown" should be deleted after the word "force" second occurrence.

Signed and sealed this 14th day of September 1971.

(SEAL)
Attest:

EDWARD M. FLETCHER, JR.　　　　　ROBERT GOTTSCHALK
Attesting Officer　　　　　　　　　　Acting Commissioner of Patents